May 26, 1942.  E. H. GREENBERG  2,284,317
METHOD FOR SCRUBBING GASES
Filed Aug. 3, 1940  4 Sheets-Sheet 2

INVENTOR.
BY Elmer H. Greenberg.
ATTORNEYS

May 26, 1942.  E. H. GREENBERG  2,284,317
METHOD FOR SCRUBBING GASES
Filed Aug. 3, 1940  4 Sheets-Sheet 3
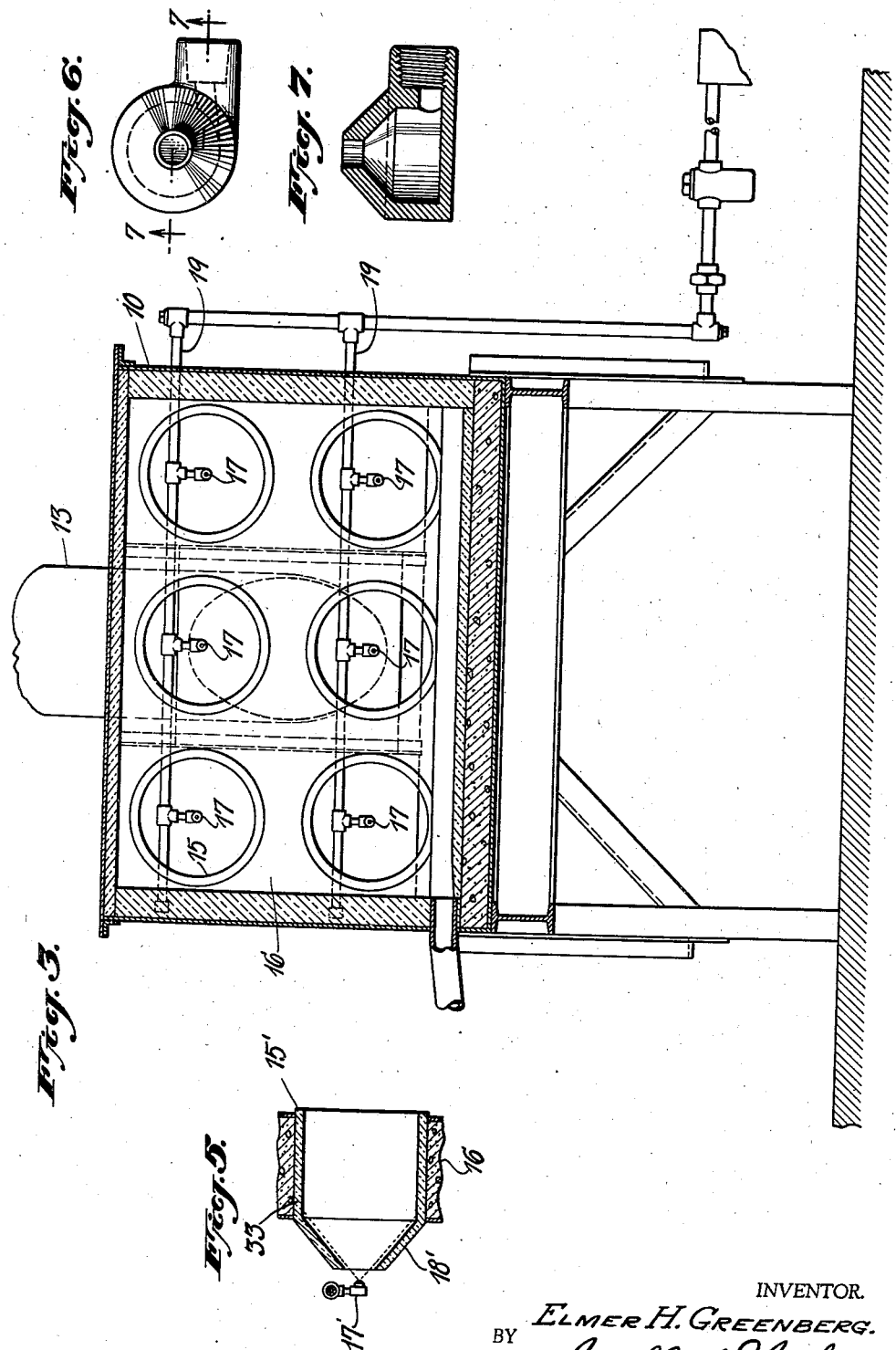
INVENTOR.
ELMER H. GREENBERG.
BY
ATTORNEYS May 26, 1942.　　　E. H. GREENBERG　　　2,284,317
METHOD FOR SCRUBBING GASES
Filed Aug. 3, 1940　　　4 Sheets-Sheet 4
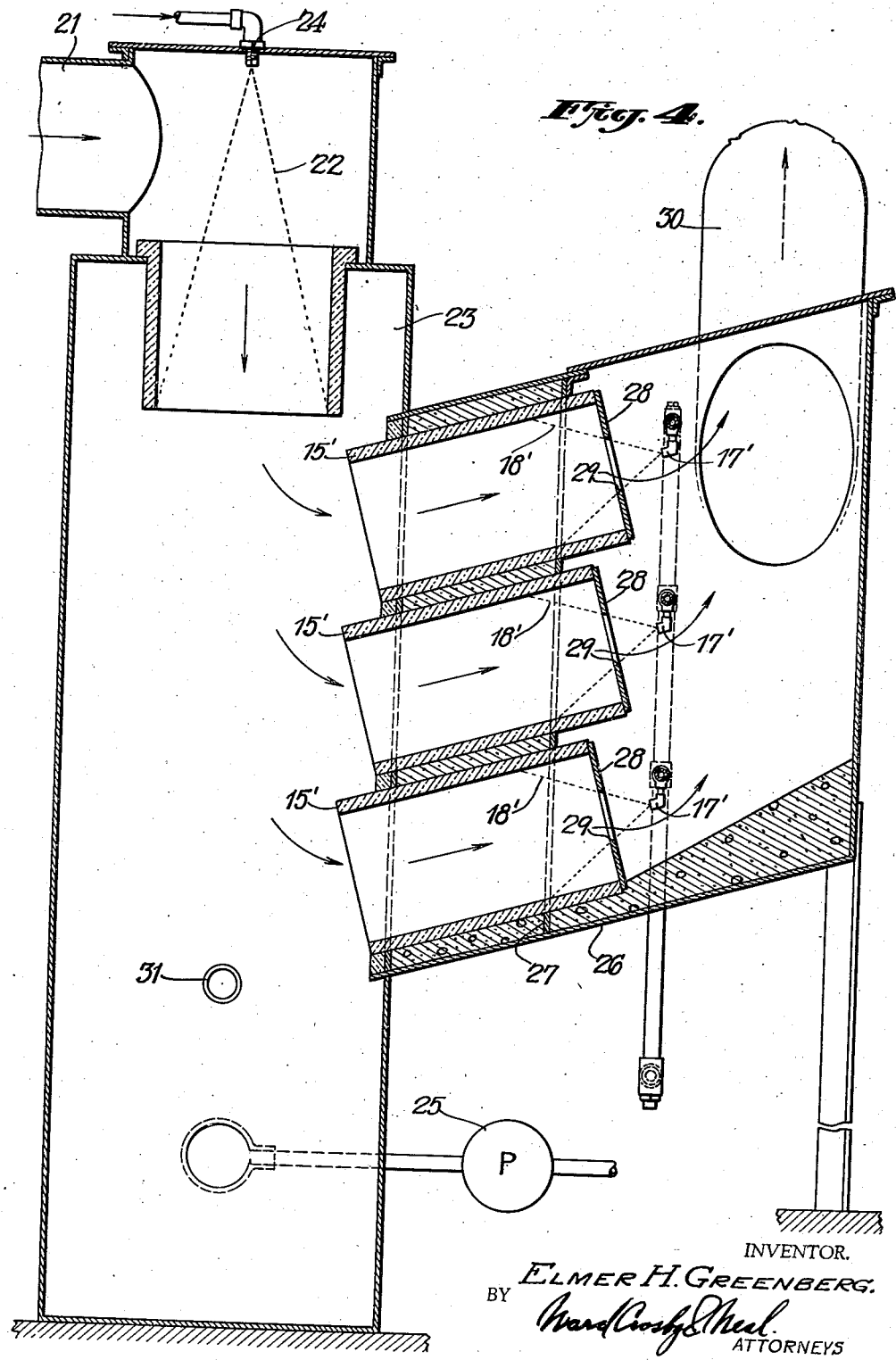
INVENTOR.
ELMER H. GREENBERG.
BY
ATTORNEYS Patented May 26, 1942

2,284,317

UNITED STATES PATENT OFFICE 2,284,317

METHOD FOR SCRUBBING GASES

Elmer H. Greenberg, Philadelphia, Pa.

Application August 3, 1940, Serial No. 350,857

1 Claim. (Cl. 183—121)

This invention relates to methods for scrubbing gas by the use of sprays, to remove suspended matter such as solid particles, smoke, fumes and the like, as well as soluble gaseous constituents in some cases.

The objects of the invention comprise in general the provision of improved highly efficient, practical and relatively inexpensive methods and apparatus for the above indicated purposes. The preferred embodiments of the invention are not only adapted to remove from the gases, materials such as dust originating from mechanical disintegration of solid material, but also fumes much finer than dust resulting from the condensation of vapors.

Various further and more specific objects, features and advantages will clearly appear from the detailed description given below taken in connection with the accompanying drawings which form a part of this specification and illustrate merely by way of example preferred forms of the apparatus of the invention. The invention consists in such novel features, arrangements and combinations of parts as may be shown and described in connection with the method herein disclosed, and also such novel methods and combinations of method steps as are disclosed and described herein.

In the drawings, Fig. 1 is a plan view of one form of apparatus for carrying out the invention;

Fig. 3 is a vertical sectional view taken substantially along the line 3—3 of Fig. 1;

Fig. 4 is a vertical sectional view illustrating another form of apparatus for carrying out the invention;

Fig. 5 is a sectional view showing certain details of a further alternative form of construction; and Figs. 6 and 7 illustrate a typical form of spray nozzle which may be used with the invention.

Figure 1:
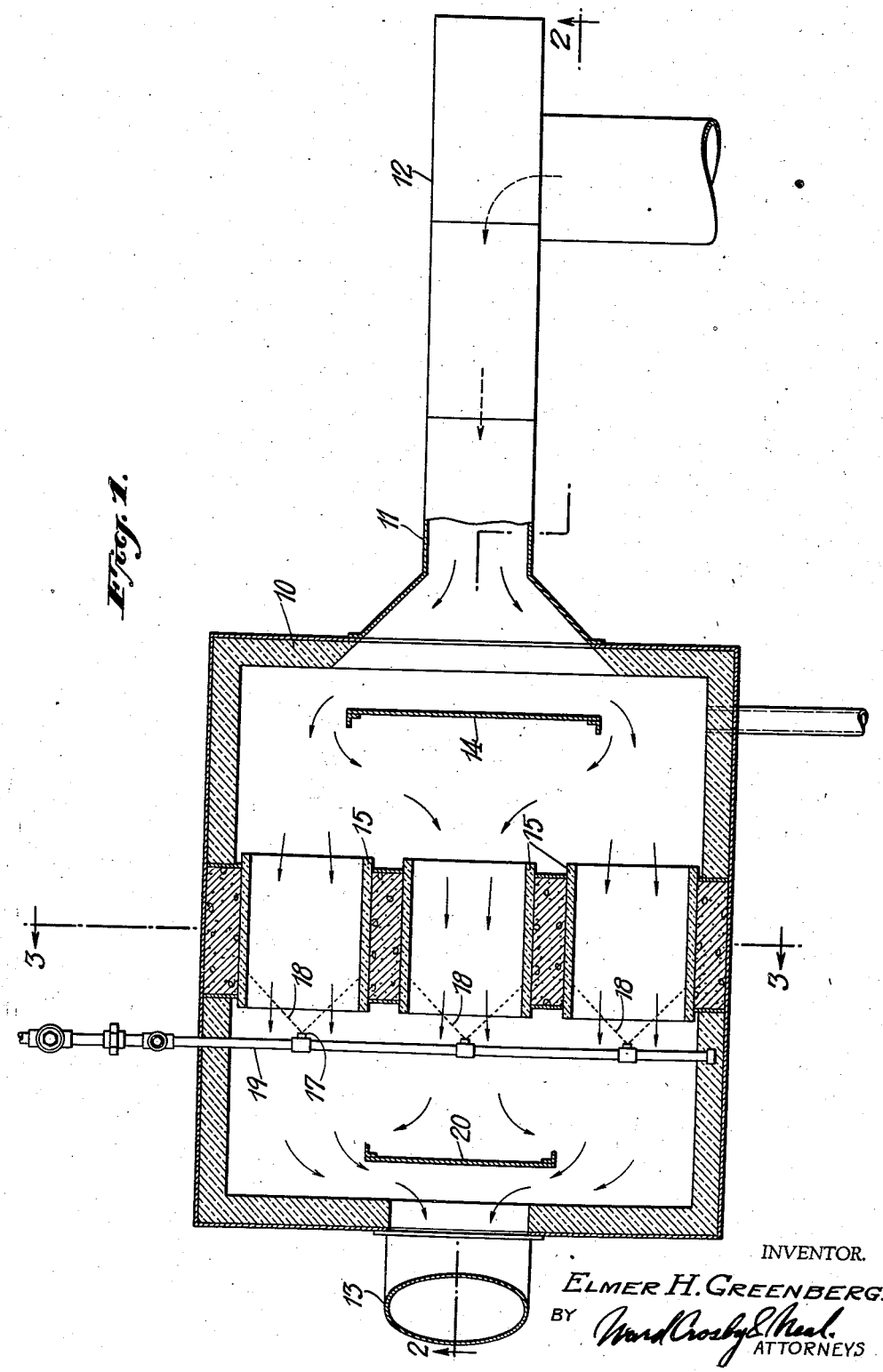
Figure 2:
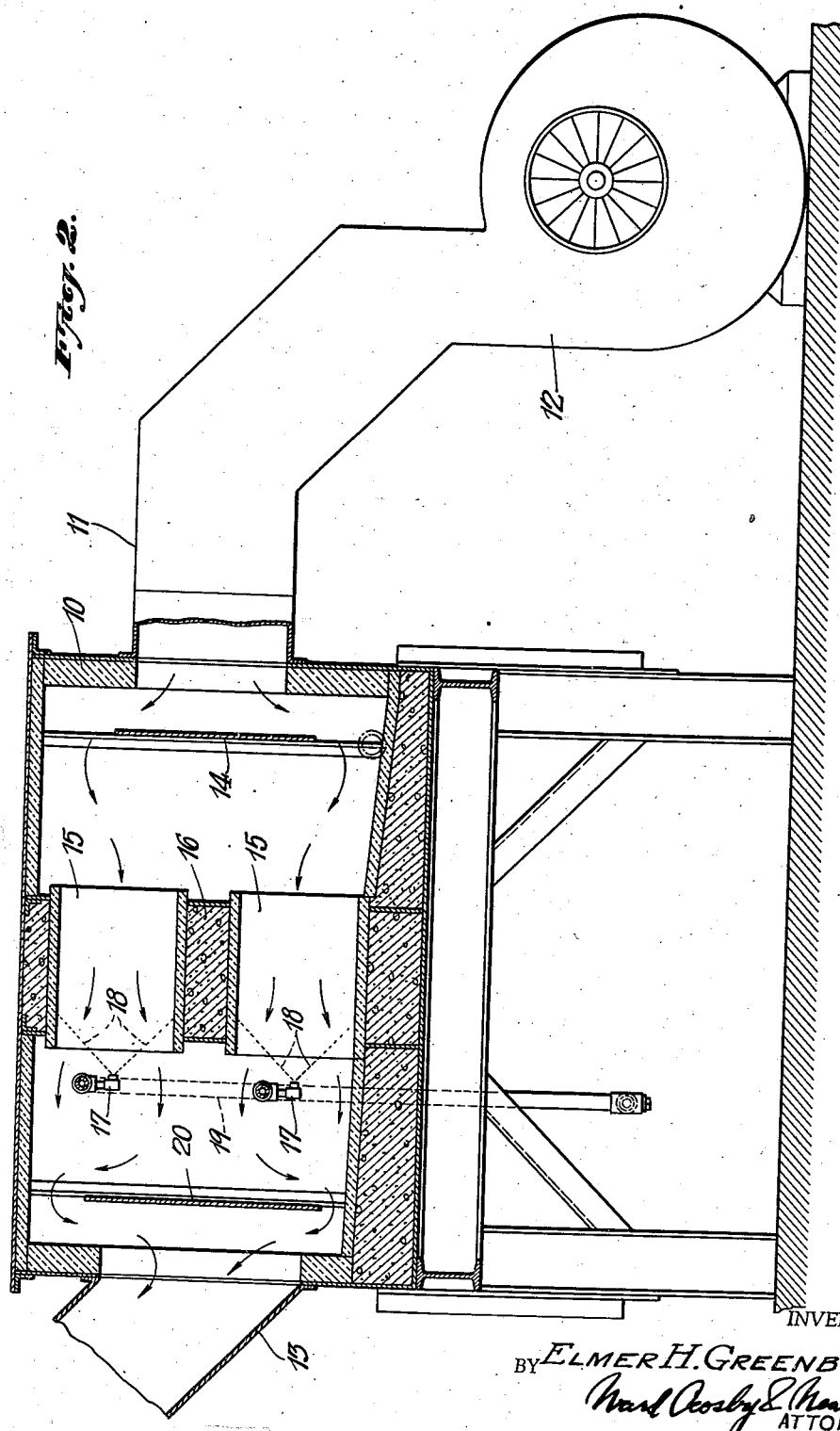
Fig. 2 is a vertical sectional view taken substantially along the line 2—2 of Fig. 1.

The method shown in the various figures will first be described and thereafter various novel features as to its operation will be explained in further detail. In Fig. 1 an enclosure for the scrubbing apparatus is shown at 10 having an inlet conduit as at 11 for the stream of gas which is to be washed, this inlet being connected for example to a blower as at 12. a gas discharge conduit is shown at 13. Upon entering the housing 10 the gas stream may first impinge upon a baffle or distributing plate as at 14, made for example of so-called stainless steel, whereupon the stream if relatively large, may be divided, each portion respectively then passing through conduits as at 15 having a diameter for example of about 16 to 22 inches. These conduits may be mounted and sealed through a wall portion as at 16 formed of concrete and faced with suitable metal, for example, and serving to separate the intake end of the housing 10 from the outlet end except for the passages through the conduits.

Means are provided at each conduit, for example in the form of spray nozzles as at 17 for projecting into each conduit a spray of the scrubbing or washing liquid as at 18 in such form as to provide substantially a continuous liquid barrier extending across the space within each conduit. The liquid for these sprays introduced for example through a conduit 19, is preferably supplied under a substantial pressure, in excess of 200 pounds per square inch, and preferably generally in the range of about 350 to 600 lbs. per square inch. This results in generally hollow conical sprays made up of extremely fine particles of the washing liquid traveling at high speed so that the sprays impinge forcefully upon the interior walls of the conduits along lines extending continuously annularly around each conduit. Thus the gases entering each conduit under pressure from the blower are forced to pass through a substantially continuous liquid barrier without possibility of escaping around the sprays. Also the sprays being produced by the high pressures above mentioned, consist of such fine closely spaced drops, that no portions of the gas streams have opportunity to pass through these liquid barriers without being subjected to the scrubbing action.

After leaving the conduits 15, the various portions of the gas stream come together and may be passed around a baffle plate as at 20 and thence out through the outlet conduit 13.

In the form of the apparatus shown in Fig. 4 the stream of gases to be treated may be introduced through a conduit as at 21, connected for example to a blower. This introduced stream may then pass down through a spray 22 into a chamber 23. The spray 22 may be formed as by a nozzle 24 connected to a source of scrubbing liquid under a relatively low or what might be termed a normal pressure of about 60 to 70 pounds per square inch or less. The spray 22 will serve to preliminarily treat the gases and remove therefrom the solid particles which are more easily separated and these will collect at the bottom of the chamber 23. The liquid from the bottom of the chamber may if desired be recirculated as by a pump 25 back through the nozzle 24. The gases entering the chamber 23, together with numerous drops of liquid from the spray 22 may then be conducted into and through a plurality of conduits as at 15', each provided with sprays as at 18' and nozzles as at 17'. The scrubbing water or other liquid is preferably supplied to the nozzles 17' as in the case of the nozzles 17, at pressures in the neighborhood of 350 to 600 lbs. per square inch or in excess of 200 lbs. per square inch.

As shown, the conduits 15' may be mounted within a suitable housing structure as at 26 provided with a barrier wall as at 27 for compelling all of the gases from the chamber 23 to pass through and not around the conduits 15'.

As shown in Fig. 4, the outlet end of each of the conduits 15' may be provided with a solid barrier of suitable sheet material as at 28. Each of these barriers 28 may have a central gas outlet aperture as at 29 of a size just large enough to accommodate the sprays as projected into each conduit. Such barriers will further contribute to the action of forcing the gas streams through the liquid barriers formed by the sprays.

If desired, instead of using barriers in the conduits of the particular form shown at 28, the outlet ends of the conduits may be of a restricted or tapered form as shown at 33 in Fig. 5 to thereby conform closely to the peripheral surfaces of the sprays.

After passing through the conduits 15', the gases may be collected in the outlet portion of the chamber or housing 26 and conducted away as through a conduit 30 for any further desired treatments. If desired, the discharged gas may be retreated with sprays in another apparatus similar to that of Fig. 4.

With the arrangement as shown in Fig. 4, it will be noted that the conduits 15' as well as the floor portions of the chamber 26 are tilted downwardly toward the chamber 23, whereby the liquid resulting from the sprays and the material collected therein may be readily discharged into the body of liquid collected at the bottom of chamber 23. An overflow outlet as at 31 may be provided at a desired height adjacent the lower portion of the chamber 23 for removing any excess liquid which is not recirculated through the nozzle 24.

With the above described arrangements using the spray nozzles as at 17 and 17' of well-known types and with pressures in the range above specified, the resulting sprays will be made up of very closely spaced drops of diameters in the neighborhood of .03 to 0.3 millimeter and the greatest percentage generally less than about 0.1, and traveling at speeds for example in the neighborhood of 60 to 100 feet per second. With such sprays and with the apparatus and methods above described, one may remove not only the fine suspended solid particles from the gas stream but also considerable portions of any soluble gases present in the gas stream.

Figs. 6 and 7 illustrate a typical well-known form of spray nozzle which may be used in connection with the apparatus of the invention although it will be understood that various other known forms may also be used. Preferably as shown, the nozzle is of a type having a chamber within which the liquid is forced tangentially under pressure so as to provide a high speed helical flow of the liquid out through the spray nozzle outlet. With the equipment as above described, and with nozzles of the type such as here shown, the nozzle outlets may be of a diameter slightly less than ¼ inch for example. Preferably as with nozzles of the types above referred to, the spray is in the form of a substantially hollow cone having an included angle of about 60 to 90°. With the apparatus as shown, in the neighborhood of 1000 cubic feet of gas per minute may be treated in each of the pipes or conduits 15 or 15'.

While spray nozzles offer many advantages for this class of apparatus, particularly since they are simple, inexpensive and embody very little in the nature of mechanism subject to the clogging and corrosive action of the dirty gases, it has not been possible to heretofore satisfactorily wash gases with the use of such sprays, to the extent of removing the finest particles and it has been found particularly difficult to collect any substantial amount of the finer fume particles. While some results may be obtained by using excessive water and an amount of power out of proportion to the amount of gas treated, on the other hand the above described method and apparatus makes possible excellent results with a reasonable amount of water and power and such results appear to depend upon novel principles embodied in this invention.

With prior attempts even by using excessive water through spray nozzles on a very slowly moving gas stream in large equipment, there was still no means of coalescing extremely fine microscopic portions of the fume with water. The drops were either too coarse to wet such fine particles, which side-stepped and passed between the drops because of the larger repelling forces and larger spaces, or if the drops were made fine enough, the pressure on the spray was consumed in breaking up the water so that the drops produced did not have the necessary speed to overcome the forces opposing wetting of the particles. This arose from the fact that what might be termed normal water pressures were used on the nozzles, amounting generally to very substantially less than 200 pounds per square inch, whereas I have found that the above specified abnormal pressures are necessary to secure both the desired fine drops and the necessary high speed of movement of the drops through the gas stream. This makes possible a spray which is capable of wetting the finest fume particles and requiring substantially a minimum of water and space for the apparatus.

Normal pressure spray nozzles have been used to produce sprays of all types of drop size from the finest to the coarsest but when a fairly fine spray is produced, the drops not only did not have the necessary speed for accomplishing the wetting action but did not have enough speed to insure their carrying to the conduit wall along which the gases are traveling. The use of the high speed fine drops is particularly effective for two reasons. First, by forming a complete spray barrier to the gas conduit wall, no portion of the gas with fume will take the easier path which is at points furthest from the nozzle, without finding a barrier of wetting drops; second, by making practically all of the drops hit the conduit, the gas after it has passed through the spray, cannot pick up the fine drops because they have become enlarged by combination on the conduit wall.

In this connection I find it preferable to spray against the flow of the gas at an angle less than a right angle so that substantially all of the drops hit the conduit and any bounding off will be towards the gas coming towards the main body of the spray. This insures collection by the spray of all drops, mist or fog that is formed if there is any condensation. Neither fume nor dust, liquid drops with or without suspended, collected material, can pass this type of spray.

Using normal pressure to produce coarser drops which will hit the gas conduit, even against the gas flow, will not give the required results because the fine fume will not be wetted. As for example doubling the diameter of the drops, cuts down their number to one-eighth for a given quantity of water, and the area swept by the water drops is in inverse proportion to the average diameter of the drops, so this area will be cut to one-eighth. Since normal drops would have to be even more than doubled to obtain the proper speed, the area becomes insufficient to secure wetting of all the particles. The spaces between the drops become large enough for the finer particles to escape in a zig-zag path, especially since it is almost impossible to wet a particle with a drop more than 200 times its diameter. This relationship will develop with coarse spray and fine fume.

Due to the continuous barrier formed and the large absorbing surface formed by a fine spray, my method includes a means of absorbing or dissolving soluble constituents, and due to the fact none of the drops of combined liquid solution can pass the main body of the spray without being collected by succeeding drops, my method also affords a means of collecting such drops. Thus the apparatus of the invention provides a simple combined absorber and collector.

On larger installations, I have found it advisable not to use large conduits because it is difficult to propel the fine drops necessary, much further than a distance controlled by the degree of the high pressure and the nozzle design, selected. To keep within this distance I find it advisable to break up the conduit area into the several smaller conduits as shown, with a nozzle in each conduit and all arranged in parallel flow.

Fresh or recirculated water can be used on either the preliminary sprays and high pressure sprays or combinations of different water sources can be used on the different sprays; a perforated box covered with filter cloth or burlap can be used for filtering the water after settling collected dust and fume, and filter presses or other mechanical devices will give the cleanest results on the water treatment.

While the invention has been described in detail with respect to particular preferred examples, it will be understood by those skilled in the art after understanding the invention, that various further changes and further modifications may be made without departing from the spirit and scope of the invention, and it is intended therefore in the appended claim to cover all such changes and modifications.

What is claimed as new and desired to be secured by Letters Patent is:

The method of scrubbing a gas stream to remove fume or particles of equally small dimensions, which comprises passing the stream through a conduit of rounded cross section, and projecting in such conduit against the flow of the gas, a spray of the scrubbing liquid formed in a spray nozzle by centrifugal action established by using a source of the liquid under pressure of about 350 pounds per square inch or higher, said spray comprising droplets mostly of a diameter of 0.1 millimeter or less, the said spray forming a substantially continuous barrier across the conduit in the form of a hollow cone with an apex angle of about 60° or wider, and the spray droplets substantially all moving with sufficient speed to forcefully impinge on the conduit walls after following substantially straight line paths from the nozzle.

ELMER H. GREENBERG.